Dec. 8, 1964    K. G. DAVENPORT    3,160,479
FORGED STEERING KNUCKLE AND METHOD OF MANUFACTURE
Filed Oct. 9, 1959    6 Sheets-Sheet 1
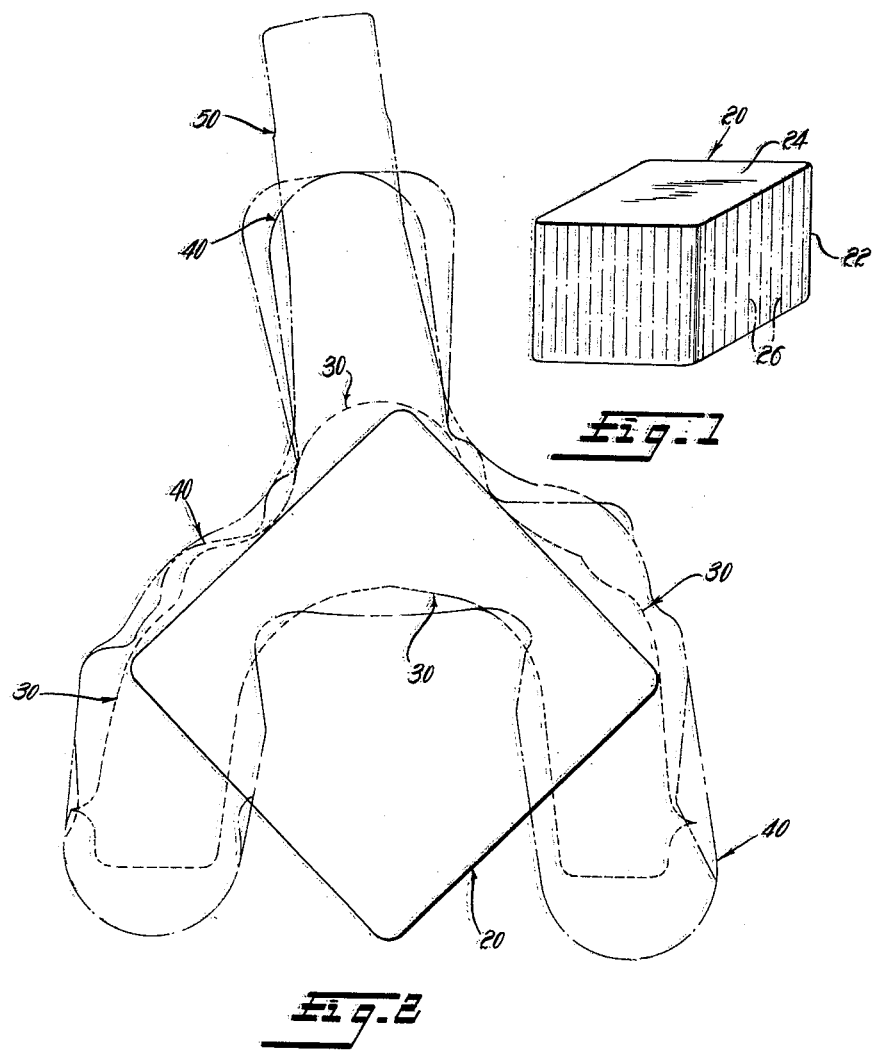
INVENTOR.
KENNETH G. DAVENPORT
BY
ATTORNEYS Dec. 8, 1964  K. G. DAVENPORT  3,160,479
FORGED STEERING KNUCKLE AND METHOD OF MANUFACTURE
Filed Oct. 9, 1959  6 Sheets—Sheet 2
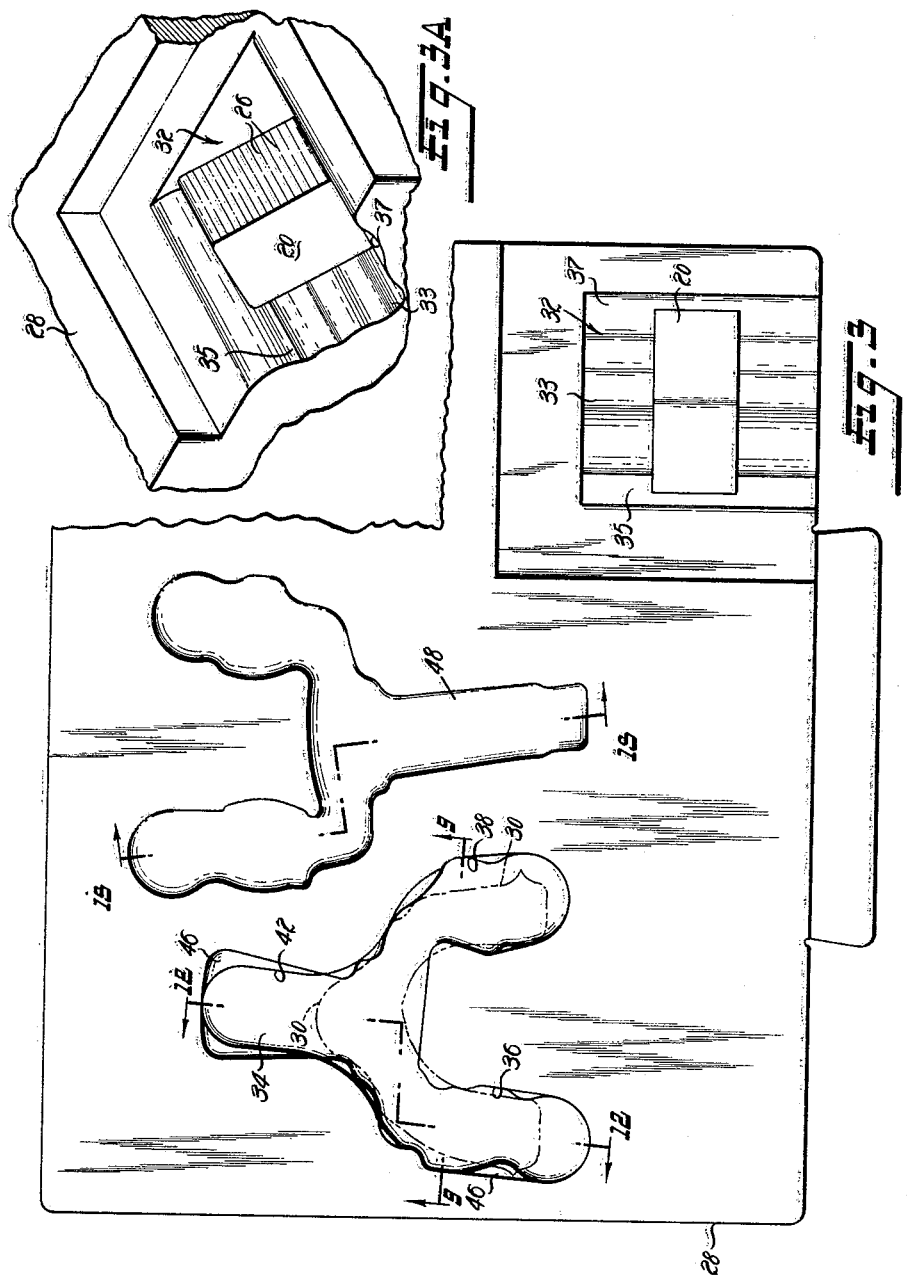
INVENTOR.
KENNETH G. DAVENPORT
BY
ATTORNEYS

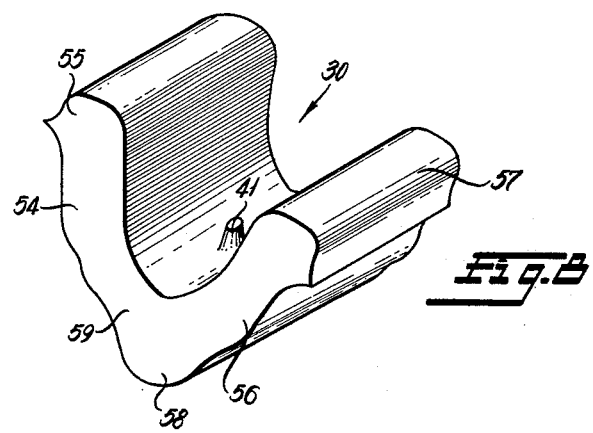
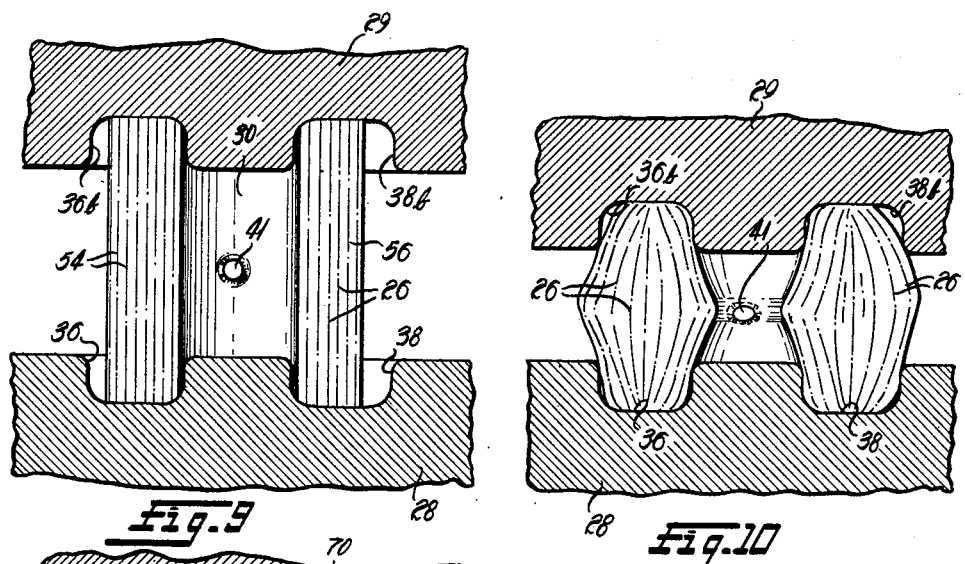
Fig. 8
Fig. 9
Fig. 10
Fig. 11
INVENTOR.
KENNETH G. DAVENPORT
BY
ATTORNEYS

INVENTOR
KENNETH G. DAVENPORT

ATTORNEYS

Dec. 8, 1964  K. G. DAVENPORT  3,160,479
FORGED STEERING KNUCKLE AND METHOD OF MANUFACTURE
Filed Oct. 9, 1959  6 Sheets-Sheet 6

INVENTOR
KENNETH G. DAVENPORT

BY

ATTORNEYS

United States Patent Office 3,160,479
Patented Dec. 8, 1964

3,160,479
FORGED STEERING KNUCKLE AND METHOD
OF MANUFACTURE
Kenneth G. Davenport, Royal Oak, Mich., assignor to
Rockwell-Standard Corporation, Coraopolis, Pa., a corporation of Pennsylvania
Filed Oct. 9, 1959, Ser. No. 845,525
5 Claims. (Cl. 29—190)

This invention relates to a novel forging process and the forged member obtained thereby and more particularly to a forged steering knuckle and its method of manufacture.

The customary and previously accepted methods of forging members of elongated and complex shapes consist essentially of forging solid metal blanks in a sidewise manner, i.e., the blank is placed in the forging apparatus with its grain lines extending normal to the direction of forging and it was considered desirable to cause a minimum flow of metal, preferably no more than half the thickness of the member being forged. While this process is satisfactory for compact shaped bodies, such as drive couplings, flanges, brackets, crankshafts, etc., in other bodies of more complex shape, such as a steering knuckle, the sidewise forging process has certain disadvantages. The shape of members like steering knuckles, which comprise three arms (two arms for support and steering and a spindle arm, extending in different directions from each other and from an intermediate flange section), often require portions of relatively thin cross section in which the highest degree of strength is required. Yet, sidewise forging of such complex shaped members often results in those portions of thin cross section being the weakest parts of the member and consequently the first to rupture under service conditions. This aspect is due to the fact that the metal grain flow lines resulting from sidewise forging are not uniformly spaced apart and do not follow the contours of the complex shaped body. This is especially true in the portions of a steering knuckle where the flange joins the steering arms and spindle, at which location grain flow lines in a sidewise forged article are in most instances merely "cut off," and do not follow a path along the arms and curving into the radial extent of the flange.

In a steering knuckle or body of similar shape, it is highly desirable to extrude the metal into sections subjected to relatively low stresses and of thick cross section, for instance, the ends of the steering arms. In other sections of the steering knuckle and particularly in the intermediate flanged portion, which is of relatively thin cross section, the metal should be densified or "packed" and the grain flow lines should preferably flow in a continuous path from the flange to the arms (i.e., not be "cut off") and they should be kept in a substantially uniformly spaced apart relationship to provide strong, rigid metal structure where highest operational stresses occur.

In the previously used horizontal or sidewise forging processes it was necessary to have a blank cut from bar stock of approximately the length and width of the finished product, often resulting in considerable waste of material. As distinguished from such previous processes, the present invention can be carried out with relatively smaller blanks and very little waste, producing a product, such as a steering knuckle, of the same comparable size, and of far greater strength. Furthermore, the present method of forging makes use of a heavier drop hammer and requires less forging blows of the hammer than the prior methods, with a resultant economical savings in time and work effort.

The complete forging process of the present invention—not including the trimming operation—can be carried out in one forge drop hammer having lower and upper dies members containing plural cooperating cavities to form the shape of the finished product, so that the blank can be worked on in one continuous quick operation without the necessity of removing the partly finished product to another hammer or of reheating the workpiece between forging operations.

The present invention results in a superior product and also provides savings in material, time and work, an important factor to be considered in today's highly competitive manufacturing market.

Initial development of this invention involved making stronger steering knuckles for heavy duty vehicles, trucks to be more accurate, without increasing the size of formerly used steering knuckles. In meeting a continuing demand for increased load capacity of trucks, industry must develop stronger components and often the strength is accompanied by an increase in weight, e.g., as capacity increases, axle weight almost always increases. Much of the increase weight of the truck and the load must pass through the steering knuckles and accordingly they must be made stronger. The previously used heavy duty forged steering knuckles could, of course, be made strong enough to withstand the increased load merely by making them bigger and heavier. However, by increasing strength in that manner the disadvantages multiply in prohibitive weights, sizes and material costs not only of the knuckles but of cooperating parts. The present invention results in a materially stronger knuckle without an accompanying increase in size or weight. By the same token a smaller, lighter weight steering knuckle can be made, in accord with this invention, for passenger vehicles without sacrificing the requisite strength of the previously used heavier larger knuckles.

Accordingly, a primary object of this invention resides in the provision of a novel forged metal steering knuckle with uniformly spaced continuous grain flow lines following the body contour between flange and arms to provide very high strength at such locations.

Another object resides in the provision of a novel forged steel steering knuckle in which a central flange portion is integral with support arms and a spindle arm and metal grain flow lines follow paths from the outer periphery of the central flange portion, radially inward and curving into and passing substantially longitudinally along respective ones of the arms.

A further primary object resides in the provision of a novel forging method for making steering knuckles, comprising of cutting a blank from a steel bar, the blank being of shorter length than its face dimension, heating the blank and upsetting or "busting" the same, transverse of its grain flow lines to produce an elongated forked body, placing this body upright with grain flow lines vertically disposed, in an adjacent cavity of the same die member, subjecting it to repeated forging blows to extrude the blank in a vertical and horizontal direction accompanied by a horizontal bowing and folding of the metal flow lines to partly form the king-pin arms and spindle of the body, turning the workpiece over, then placing it in another adjacent "finish" cavity of the same die member to form the final forged shape of the article, and trimming the article after the finish operation.

Another object resides in the provision of a method to hot forge a complex shaped body so as to densify or "pack" the metal in selected portions of the body and to retain a substantial portion of uniformly spaced apart grain flow lines in other selected portions, achieved by means of crosswise deformation and subsequent vertical and horizontal extrusion of a metal blank.

A further object resides in the provision of a novel forging process for steering knuckles to accomplish a substantial saving of material, time and work, and still produce a comparatively superior product of increased strength and life.

Further features and other objects of this invention will become apparent from the following detailed description, discussion and the appended claims taken in conjunction with the accompanying drawings, schematicaly illustrating the forging process and the forged steering knuckle and in which:

FIGURE 1 represents a metal blank from which the product will be formed, the blank being cut from a square shaped bar of steel and the direction of metal grain flow lines being depicted by light phantom lines;

FIGURE 2 is a composite plan view, schematically illustrating the relationship between the initial blank of metal and the subsequently formed shapes of the body resulting from the first or "bust" operation, the second or "blocker" operation and the third or "finish" operation;

FIGURE 3 is a plan view of the lower die block member showing the outlines of the three different shaped die cavities;

FIGURE 3a is a detail perspective view of the first die cavity showing the open side of the cavity and the metal blank in proper position in the cavity;

FIGURE 8 is a perspective view illustrating the formed blank after completion of the first or "bust" operation;

FIGURES 9 to 11 are transverse vertical cross sections, near the yoke flange portion of the workpiece, through both upper and lower dies, taken substantially on line 9—9 of FIGURE 3, illustrating the second or "blocker" operation, showing the vertical extrusion of the preformed "bust" blank resulting from "blocker" strokes;

Figure 4:
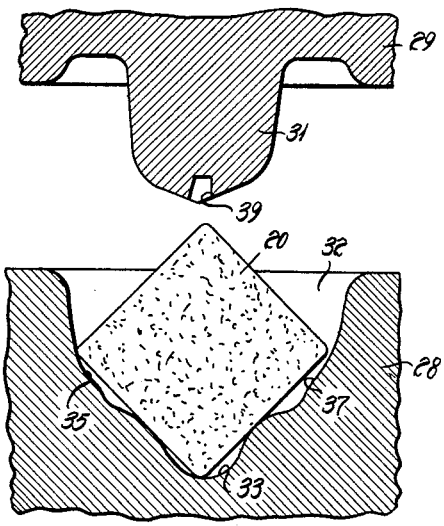
FIGURES 4 to 7 are vertical transverse cross sections through the upper and lower dies at the first cavity with the workpiece in place between the dies showing displacement of the metal during the "bust" strokes.
Figure 5:
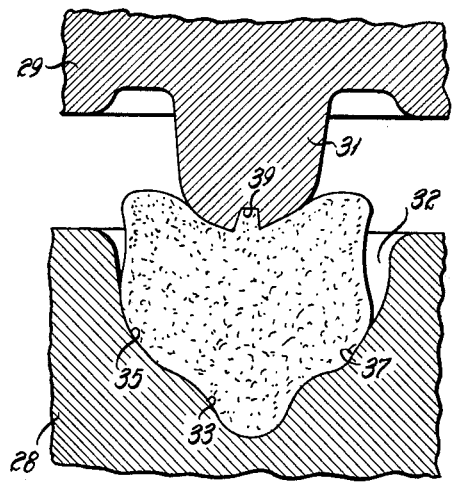
Figure 6:
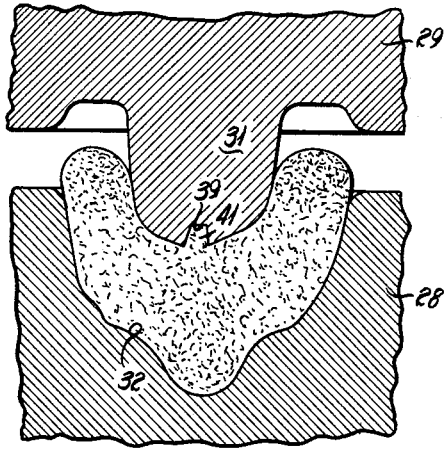
Figure 7:
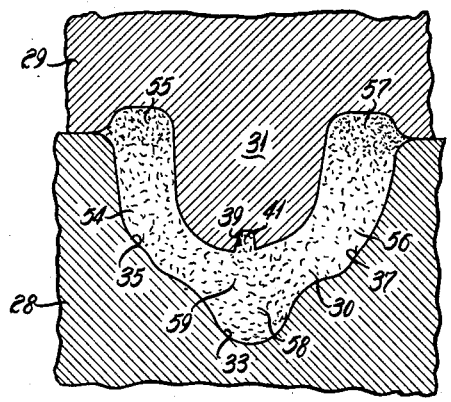
Figure 17:
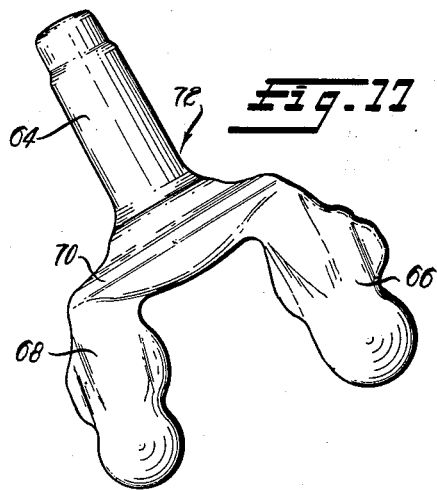
FIGURE 17 is a view of the finished and trimmed forging of a steering knuckle made in accord with the present novel method.

Summarily, the forging process of this invention may be described as follows: The stock blank 20 or workpiece is laid in the "busting" depression as shown in FIGURES 3a and 4. Two or three hammer blows force the blank into the "horseshoe" shape workpiece 30 shown in FIGURES 7 and 8. The workpiece 30 is then set on end in the blocking die depression (FIGURES 3, 9 and 12) and tapped lightly with the hammer to set it firmly in position. It is then struck with six to eight hammer blows (FIGURES 10, 11, 13 and 14). It is lifted out, turned over, (compressed air being applied to remove the scale) placed in the "finish" die depression (FIGURE 3) and struck with from two to four blows (FIGURE 15). It is removed, transferred to a second trim press and the flashing cut off, and the resultant forging 72 is shown in FIGURE 17.

With more specific reference to the various figures, the successive steps of the novel method and the resultant configurations of the workpiece will be described in detail. FIGURE 1 shows a square shaped steel blank 20 of suitable size cut from bar stock in which the grain flow lines are, of course, longitudinal. The blank is preferably square although it could be round or polygonal in cross section. When the stock is square, the resultant length dimension of blank 20, i.e., side 22, is shorter than the dimension of the sides of the square end faces 24. The metal grain flow lines, indicated in phantom lines at 26, run parallel to the longitudinal axis of the blank 20. It is a known fact that the longitudinal center of a rolled steel bar has the least refined metallic structure due to its being the remotest from the surface and therefore receiving the least working, whereas the portions closer to the surface of the bar are more refined in their metallic structure and contain less impurities and imperfections, and consequently have the ability to withstand greater stress. This forging process places the highest strength portions of the blank into positions in the finished article where highest stresses occur.

FIGURE 2 is a diagrammatic comparison of the workpiece between the successive steps as it is being shaped, showing the blank at 20, the workpiece after the first or "bust" operation at 30, after the second or "blocker" operation at 40, and after the third or "finish" operation at 50.

FIGURES 3 and 3a illustrate a lower forging hammer die block 28 including several forming die cavities for successive use in forming a blank into a desired shape. A feature which will be appreciated is that the entire forging operation can be performed in one die set and consequently only one forging hammer is used. The workpiece stays in the one machine and is merely moved from one die cavity to another between hammer operations. The upper die block 29 is of substantially the same shape as the lower die block 28, but in reverse arrangement and with the exception that it includes a punch like extension 31 for the first forging operation to extrude and elongate the blank 20 and partly form the arms of the workpiece.

The lower right hand corner of the lower die block 28 is provided with a tub like cavity 32 with an open front side for operator convenience, as best seen in FIGURE 3a, constituting the so-called "bust" station. "Bust" cavity 32 is an elongated channel having a concave bottom portion 33 with side walls formed into complex curved sides 35 and 37. The channel bottom 33 and sides 35 and 37 form the outside shape of the workpiece 30, as seen in FIGURE 8. To form the "bust" workpiece 30, a blank 20 is heated to the proper forging temperature, placed lengthwise and in diagonal position (see FIGURE 3a and also view FIGURE 2 upside down) into a first forming die cavity 32 of a lower die block 28 of a steam or drop hammer forge and subjected to repeated blows to displace the metal outwardly into the arm sections of the knuckle and simultaneously elongating the blank in the direction of its fibers. By such placement of the blank and by such a die formed shape, the least refined metallic structure of the longitudinal center portion remains substantially in the longitudinal center of the formed member, and the grain flow lines in the horseshoe shaped workpiece 30 retain the longitudinal parallel direction which was present in blank 20.

Due to the relatively thick cross sections of the arms and spindle of a steering knuckle and the fact that the central portions of the lower ends of the arms are bored to permit the king-pin to extend therethrough, the refined nature of the metallic structure at those portions is obviously of less importance than in other portions and the metal in these arm and spindle portions need only be extruded into the desired shape, whereas in the yoke and flange portions, which have lesser cross section dimensions and must withstand greater wear and stress, the metal grain flow lines should be uniform and, insofar as is possible, should follow the shape or contours of the complex body as will become clear in the following description. The punch portion 31 of the upper die block is provided intermediate its ends with a tapered recess 39 to subsequently form a stud 41 in the concave side of the formed blank 30, which serves as a tang-gripping means to enable an operator to conveniently remove the workpiece from the "bust" station and place it in the next die station.

Turning back to FIGURE 3, at the left hand side of lower die block 28 is another forming cavity 34 to form the intermediate shape 40 of the steering knuckle workpiece and constituting the so-called "blocker" station. Die cavity 34 has arm channels designated by the numerals 36 and 38, and a spindle forming channel 42 extending from an arm connecting yoke section 44. Cavity 34 is provided at several points around the circumference with recessed sections 46, so-called "flares," to allow excessive metal to flow inbetween the dies. The upper die block 29 is provided with a corresponding cavity designated in other figures by the same numerals with the suffix "b." Intermediate the "bust" cavity 32 and the "block" cavity 34 is another die cavity 48 arranged in reverse position to cavity 34 for forming the finished shape of the steering knuckle. Here the spindle section 42', yoke 44' and arm section 36' and 38' assume their final forged shape. The upper die 29 is provided with a corresponding cavity designated in subsequent figures by the same numerals followed by the suffix "c."

When the "bust" operation is completed, blank 20 has been formed into the thick wishbone or horseshoe like workpiece 30, illustrated in FIGURE 8. Workpiece 30 now has arm portions 54 and 56, FIGURES 7 and 8 respectively, steering arm ends 55 and 57 and spindle boss 58 forming relatively thick sections at those places from which in the second or "blocker" step the spindle and arms will be further extruded. The metal in the yoke and flange section 59 is primarily "packed" or densified during this first or "bust" operation, providing a rigid metal structure at this junction.

Figure 12:
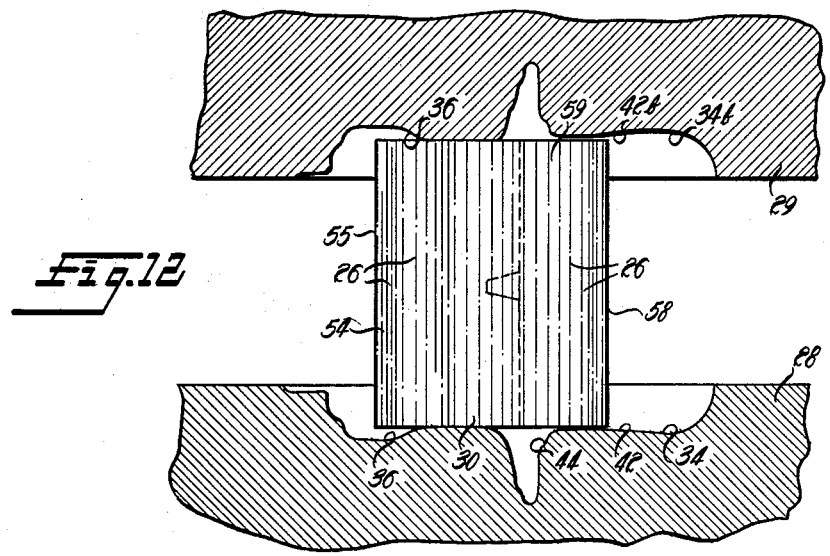
FIGURES 12–14 are longitudinal vertical cross sections through one arm, the flange and the spindle of the knuckle and the upper and lower dies at the "blocker" station, taken substantially along line 12—12 of FIGURE 3, illustrating the second or "blocker" operation, and showing vertical extrusion of the flange and horizontal extrusion of the ends of arms and spindle.
Figure 13:
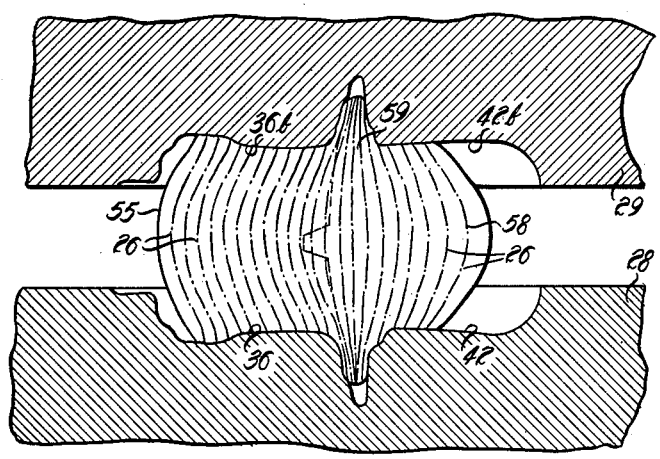
Figure 14:
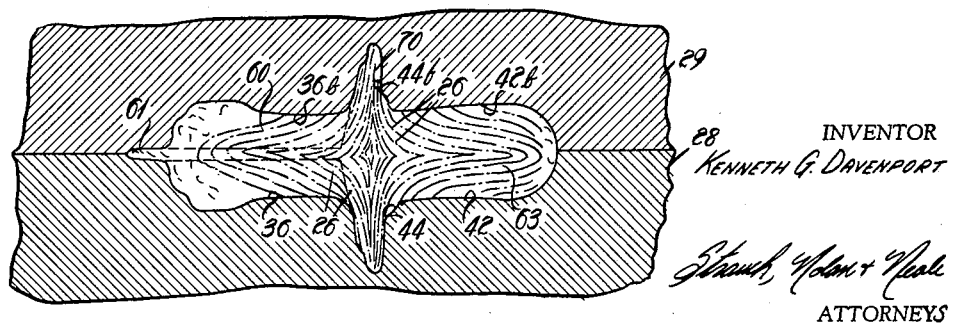
Figure 15:
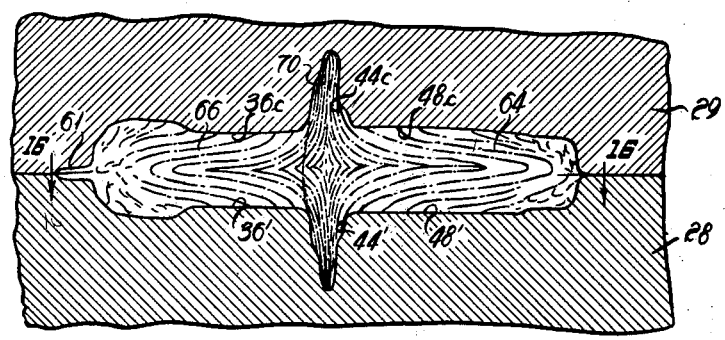
FIGURE 15 is another longitudinal vertical cross section through the closed dies at the "finish" station, taken substantially along line 15—15 of FIGURE 3.

With further reference to FIGURES 9 to 14, the workpiece and blocker dies 34 and 34b are shown in transverse cross sections near the yoke portion in FIGURES 9 to 11 and in longitudinal cross section in FIGURES 12, 13 and 14. The shaped "busted" workpiece 30, while still hot, is removed from "bust" cavity 32 by gripping it on the form stud 41 immediately after it is formed and placed upright (that is, with the grain flow lines running vertical, as seen in FIGURES 9 and 12 and in broken lines in FIGURE 3) in lower die cavity 34 for the so-called "block" or "break" forging operation. Repeated hammer blows of the upper die block 29 on the "busted" workpiece 30 causes the workpiece to be extruded into cavities 34 and 34b of the lower and upper die blocks. It will be noted in FIGURES 10 and 11 and corresponding FIGURES 13 and 14 that the grain flow lines are folded back from the arm and spindle extremities to substantially follow the forged contours of the body longitudinally in the extremities and radially in the yoke flange.

The repeated blows of the upper die 29 cause the thick spindle boss section 58 of the elongated member 30 to bulge and be extruded into the spindle forming section 42 to form the intermediate spindle shape 63. This operation also further extrudes the preformed arm sections 54 and 56 into the arm recesses 36 and 38 of die cavities 34 and 34b, forming intermediate arm shapes 60 and 62 (FIGURES 11 and 14). The intermediate flange forming yoke section 59 of member 30 receives such working by this novel vertical extrusion process that the metal at this vulnerable section will be thoroughly "packed" or densified into the intermediate flange shape 70 (FIGURE 11). Very little metal is extruded from this yoke flange section and, as will be seen from the position of the grain flow lines 26 in FIGURE 14, the grain flow lines, although still uniformly spaced apart, are much closer together (densified) in the critical sections particularly where the arms and spindle join with the yoke flange. The grain flow lines at the ends of arms and spindle assume a somewhat "whirling" state, and may be disrupted, having been folded upon each other. The grain flow lines are not "cutoff" at the yoke flange section, as has been the case in prior forging methods, and which resulted in a weak structure. As illustrated, the grain flow lines follow uninterrupted the contours of the shaped body; that is, from a radial position in the flange section to a longitudinal position in the arm and spindle sections, then back through the arms and spindle sections to a radial position in the yoke flange.

Excessive metal is partly squeezed out to a relatively thin "flash" section 61 between both arm portions 60 and 62 and around the outlines of the formed member.

This partly finished steering knuckle workpiece 40, while still hot, is immediately removed from cavity 34, scale is removed, the workpiece 40 is turned around and placed in "finish" die cavity 48 for the finish forging operation. Again, repeated blows from the upper die block 29 further extrude and shape the intermediate spindle section 63 into a finished spindle 64 (FIGURES 15 and 17) and simultaneously further extrude and shape the intermediate arm portions 60 and 62 to assume their final shapes 66 and 68 in FIGURES 15 and 17. The intermediate flange or yoke portion 70 receives little or no work to form the finished flange 70. This finish operation does not disturb the uniformity of the grain flow line structure (FIGURE 14) which existed at the end of the "blocker" operation.

The finished workpiece 50 is then placed into a trimming die (not shown) where the excessive metal 61 known as "flash," which was squeezed out inbetween the dies during forging operations, is trimmed off and the finished forged steering knuckle 72 appears in FIGURE 17.

Figure 16:
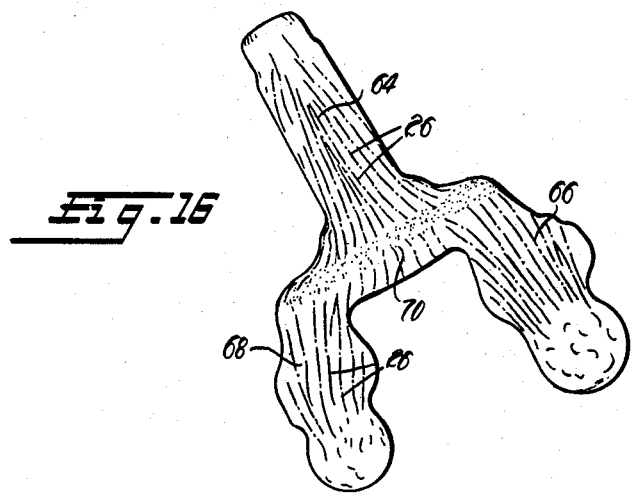
FIGURE 16 is a horizontal section through the finish forged knuckle taken on line 16—16 of FIGURE 15 to help illustrate the metal grain flow line disposition.

The disposition of the grain flow lines 26 in the finish forged knuckle 72 are essentially as shown in FIGURE 15. FIGURE 16 illustrates that disposition of the grain flow lines in the arms 66 and 68 and the spindle 64 is substantially longitudinal of the extremities and as the flow lines approach the yoke flange portion 70, they will curve outward toward the viewer into the flange contour. Thus even though the yoke flange 70 is relatively thin in cross section, the grain flow lines in the yoke are not cut off by the outer surfaces of the flange but extend from the flange periphery inward and curve into the extremities 64, 66 and 68 to provide an extremely high strength integral connection between the steering knuckle, spindle 64 and arms 66 and 68 which is the most common location of failure in previously known steering knuckles.

The foregoing description clearly discloses and describes an improved method of hot forging steel steering knuckles or members of similar complex shape, together with the superior end product with specific interior structural characteristics, the steering knuckle having an increased strength and life over previously known steering knuckles of a comparative size. The method enables use of comparatively less material, having negligible waste, and requiring less time to produce than previous methods. Accordingly, manufacturing costs are considerably reduced.

By reference to the uniform nature of grain flow lines in this specification and the claims, it is meant to have the grain flow lines in a forged metal member run along a certain pattern with each line substantially parallel to the other and preferably of equal length without being cut off at any one point. Thus, uniform grain flow lines are most desirable in a forged metal member which is subjected to high stresses, but can not always be achieved. In a metal body of relatively simple construction, such as an axle shaft etc., uniform grain flow lines may easily be obtained but not in a complex shaped metal body, as a steering knuckle, where former forging methods would not result in a uniform grain flow line structure. In those former methods the grain flow lines were cut off at sections where the cross sectional dimensions of the body changed abruptly, which would make those sections extremely weak in regard to other sections of the metal body, with consequent early failure at those points.

The present invention may be embodied in other specific forms without departing from the essential characteristics and spirit thereof. The present embodiment is, therefore, to be considered in all respects as illustrative and not restrictive, the scope of the invention being indicated by the appended claims rather than by the foregoing description. All changes which come within the meaning and range of equivalency of the claims are therefore intended to be embraced therein.

What is claimed and desired to be secured by United States Letters Patent is:

1. A method of making a forged steel steering knuckle from a square steel blank with lateral refined metal grain flow lines consisting of: "bust" forging the blank into a die pocket to form a laterally thick wishbone shaped workpiece with laterally disposed flow lines derived from elongated original grain flow lines; a further forging step consisting of vertical and horizontal extrusion of said rough blank by applying forging force laterally on said wishbone shaped workpiece and parallel to said laterally disposed flow lines, resulting in densification or packing of a group of metal grain flow lines into a yoke flange periphery and causing uniform and continuous disposition of said group of grain flow lines in a doubled back arrangement into the spindle and arms smoothly flowing from said grain flow lines in the yoke flange periphery which are substantially normal to the flow lines in the spindle and arms.

2. A method of forging a steel blank with substantially straight and parallel grain flow lines into a high strength steel forged member consisting of a central body portion and plural extremities extending from the central body portion comprising: exerting a forging force on the blank normal to its grain flow direction to force the metal in a direction normal to its grain flow into a rough shape having a central portion and plural extremities and simultaneously extruding the metal in the same direction as its grain flow to obtain a workpiece retaining the substantially straight and parallel, but elongated, grain flow lines of the blank; and exerting a further forging force on the shaped workpiece in a direction parallel to and in the direction of the grain flow lines of the workpiece to cause relative densification, and substantially no change in direction, of grain flow lines adjacent the periphery of the central portion, causing lateral extrusion forming of the extremities of the workpiece with attendant bowing and doubling of the midportions of groups of the densified grain flow lines in the central portion into a longitudinal disposition in the plural extremities.

3. A method of hot forging a high strength steel member with a central body portion and at least three arms, from a steel blank within a single forging machine, comprising: a "bust" operation on the blank applying forging force normal to the grain flow lines in the blank to form a rough shaped workpiece; a "block" operation on the workpiece wherein a forging force is applied in the direction of the grain flow lines to form a member with semi-finished shape in which grain flow lines in peripheral portions of the central body portion are essentially normal to the arms, and groups of intermediate portions of the said grain flow lines are bowed from the central body portion to pass into a substantially longitudinal disposition in the arms; and a "finish" forging operation on the semi-finished shape to give final elongate shape to the arms.

4. A method of forging a steering knuckle from a squared steel blank cut from the end of a rolled steel bar so the grain flow lines pass lengthwise of the blank comprising: exerting a forging force on the blank normal to the grain flow line direction to form a workpiece shaped roughly like a thick wishbone with grain flow lines remaining straight and parallel; and exerting further forging force in the direction of the grain flow lines to form the knuckle flange by densification of the metal with transverse packing of the flow lines and extrusion forming the knuckle spindle and arms with a resultant grain flow pattern in continuous paths from the peripheral portion of the flange into the spindle and arms, doubling back through the spindle and arms and back through the flange to an opposite side portion of the flange periphery.

5. A one-piece forged steering knuckle comprising a yoke flange, a spindle extending substantially perpendicularly from one side of said yoke flange, and a pair of spaced apart substantially parallel knuckle king-pin mounting support arms extending from the other side of said yoke flange in essentially parallel relation to said spindle, said flange extending radially outwardly with respect to the longitudinal axes of said spindle and said arms, said spindle being formed with substantially uniformly spaced apart, continuous, grain flow lines passing longitudinally into said spindle from said yoke flange along essentially parallel paths and being smoothly doubled back at the end of said spindle remote from said yoke flange to extend longitudinally back through said spindle and into said yoke flange, each of said arms each being formed with substaantially uniformly spaced apart, continuous grain flow lines passing longitudinally into each arm from said yoke flange along essentially parallel paths and being smoothly doubled back at the end of each arm remote from said yoke flange to extend longitudinally back through each arm and into said yoke flange, the grain flow lines in said flange, said arms, and said spindle being so disposed as to follow the contour thereof, the grain flow lines in said yoke flange extending along continuous paths from said arms and said spindle and being packed in said yoke flange in approximately parallel relation to opposite sides of said flange.

References Cited in the file of this patent
UNITED STATES PATENTS

| | | |
|---|---|---|
| 810,007 | Ward | Jan. 16, 1906 |
| 1,340,528 | Dalman | May 18, 1920 |
| 1,459,592 | Latta et al. | June 19, 1923 |
| 1,656,929 | Whitney | Jan. 24, 1928 |
| 1,767,415 | Thompson | June 24, 1930 |
| 1,791,187 | Brauchler | Feb. 3, 1931 |
| 2,335,590 | Gersman | Nov. 30, 1943 |
| 2,513,710 | Brauchler | July 4, 1950 |
| 2,700,211 | Woolf | Jan. 25, 1955 |
| 2,764,804 | Arness | Oct. 2, 1956 |